United States Patent
Koh et al.

(10) Patent No.: US 11,923,538 B2
(45) Date of Patent: Mar. 5, 2024

(54) NEGATIVE ELECTRODE FOR LITHIUM SECONDARY BATTERY AND LITHIUM SECONDARY BATTERY COMPRISING SAME

(71) Applicant: LG ENERGY SOLUTION, LTD., Seoul (KR)

(72) Inventors: Dongwook Koh, Daejeon (KR); Doo Kyung Yang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 17/993,191

(22) Filed: Nov. 23, 2022

(65) Prior Publication Data
US 2023/0082675 A1    Mar. 16, 2023

Related U.S. Application Data

(63) Continuation of application No. 16/652,504, filed as application No. PCT/KR2018/013755 on Nov. 13, 2018, now Pat. No. 11,539,045.

(30) Foreign Application Priority Data

Nov. 13, 2017  (KR) .................. 10-2017-0150318
Nov. 12, 2018  (KR) .................. 10-2018-0138254

(51) Int. Cl.
*H01M 4/36*      (2006.01)
*H01M 4/134*     (2010.01)
(Continued)

(52) U.S. Cl.
CPC ........... *H01M 4/366* (2013.01); *H01M 4/134* (2013.01); *H01M 4/137* (2013.01); *H01M 4/382* (2013.01);
(Continued)

(58) Field of Classification Search
CPC ........... H01M 4/36; H01M 4/38; H01M 4/62; H01M 4/131; H01M 50/46; H01M 10/052
See application file for complete search history.

(56) References Cited

U.S. PATENT DOCUMENTS

2004/0029014 A1 *  2/2004  Hwang ............. H01M 4/136
                                                  429/251
2004/0253510 A1 * 12/2004  Jonghe ............. H01M 4/62
                                                  429/231.95
(Continued)

FOREIGN PATENT DOCUMENTS

CN    103718337 A    4/2014
CN    106450422 A    2/2017
(Continued)

OTHER PUBLICATIONS

Extended European Search Report for European Application No. 18876971.5, dated Nov. 4, 2020.
(Continued)

*Primary Examiner* — Kenneth J Douyette
(74) *Attorney, Agent, or Firm* — Birch, Stewart, Kolasch & Birch, LLP

(57) ABSTRACT

A negative electrode for a lithium secondary battery including a lithium metal layer; a first protective layer formed on a surface of the lithium metal layer; and a second protective layer formed on a surface of the first protective layer opposite the lithium metal layer, wherein the first protective layer and the second protective layer are different from each other in at least one property selected from the group consisting of ion conductivity and electrolyte uptake.

10 Claims, 2 Drawing Sheets

(51) Int. Cl.
    *H01M 4/137*     (2010.01)
    *H01M 4/38*     (2006.01)
    *H01M 4/62*     (2006.01)
    *H01M 10/052*     (2010.01)
    *H01M 4/02*     (2006.01)

(52) U.S. Cl.
    CPC ......... *H01M 4/628* (2013.01); *H01M 10/052* (2013.01); *H01M 2004/027* (2013.01)

(56) References Cited

U.S. PATENT DOCUMENTS

| | | | |
|---|---|---|---|
| 2005/0008939 A1* | 1/2005 | Ota | H01M 4/0426 429/324 |
| 2005/0042515 A1 | 2/2005 | Hwang et al. | |
| 2005/0095504 A1 | 5/2005 | Kim et al. | |
| 2010/0119939 A1 | 5/2010 | Misumi et al. | |
| 2013/0017441 A1 | 1/2013 | Affinito et al. | |
| 2014/0377670 A1 | 12/2014 | Khiterer et al. | |
| 2015/0295246 A1 | 10/2015 | Son et al. | |
| 2016/0372743 A1 | 12/2016 | Cho et al. | |
| 2017/0062829 A1 | 3/2017 | Ryu et al. | |
| 2017/0141402 A1 | 5/2017 | Affinito et al. | |

FOREIGN PATENT DOCUMENTS

| | | |
|---|---|---|
| CN | 106654172 A | 5/2017 |
| CN | 107123788 A | 9/2017 |
| JP | 2005-142156 A | 6/2005 |
| JP | 2014-520370 A | 8/2014 |
| KR | 10-2005-0023123 A | 3/2005 |
| KR | 10-2005-0041093 A | 5/2005 |
| KR | 10-2005-0041661 A | 5/2005 |
| KR | 10-0542213 B1 | 1/2006 |
| KR | 10-2007-0021110 A | 2/2007 |
| KR | 10-2014-0125970 A | 10/2014 |
| KR | 10-2015-0030156 A | 3/2015 |
| KR | 10-2015-0056122 A | 5/2015 |
| KR | 10-1580995 B1 | 12/2015 |
| KR | 10-2016-0034173 A | 3/2016 |
| KR | 10-2017-0026098 A | 3/2017 |
| KR | 10-2017-0061866 A | 6/2017 |
| WO | WO 2005/038953 A2 | 4/2005 |
| WO | WO 2016/112333 A1 | 7/2016 |

OTHER PUBLICATIONS

International Search Report for PCT/KR2018/013755 dated Feb. 22, 2019.

* cited by examiner

[Figure 1]
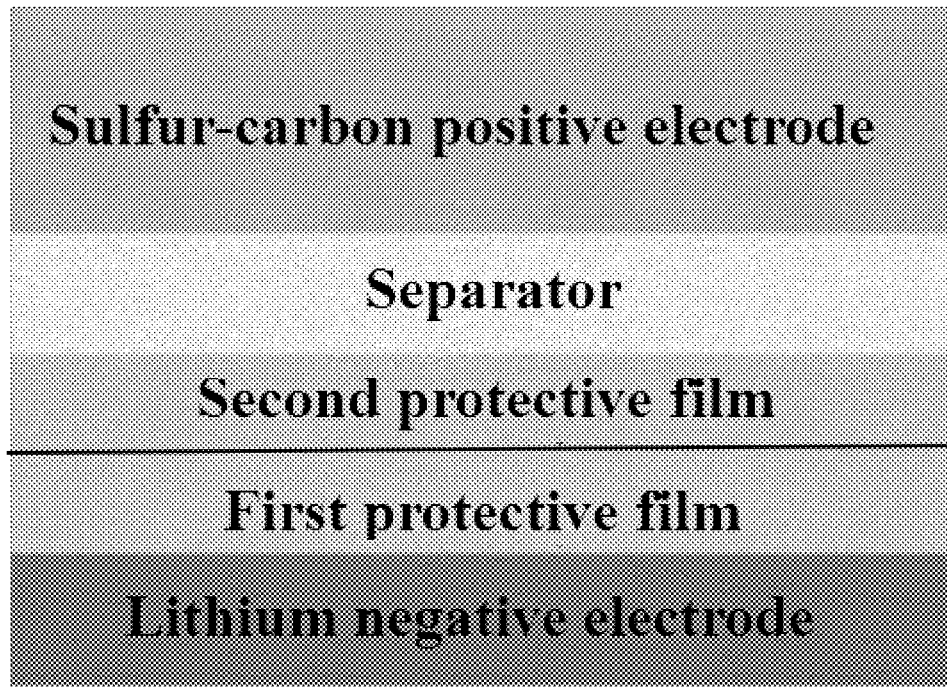
[Figure 2]
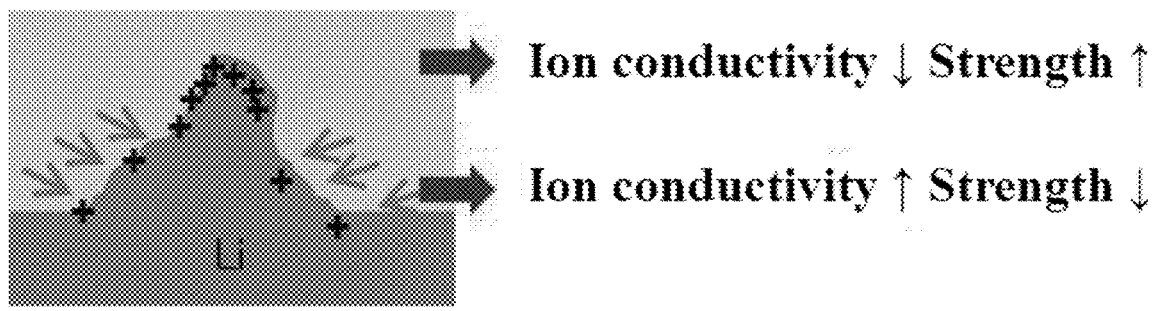

[Figure 3]
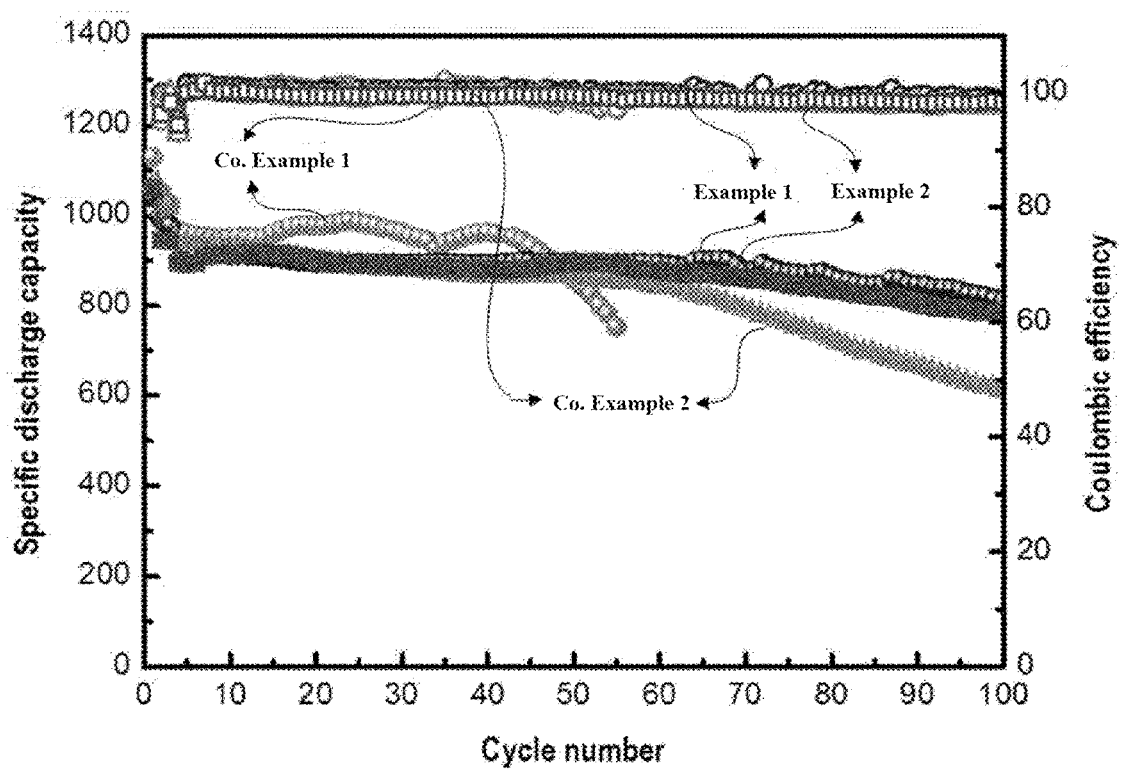

NEGATIVE ELECTRODE FOR LITHIUM SECONDARY BATTERY AND LITHIUM SECONDARY BATTERY COMPRISING SAME

CROSS-REFERENCE TO RELATED APPLICATIONS

This application is a Continuation of copending application Ser. No. 16/652,504 filed on Mar. 31, 2020, now U.S. Pat. No. 11,539,045, which is the U.S. National Phase of PCT/KR2018/013755, filed Nov. 13, 2018, and which claims priority under 35 U.S.C. § 119(a) to Application No. 10-2017-0150318 filed in Korea, on Nov. 13, 2017 and Application No. 10-2018-0138254 filed in Korea, on Nov. 12, 2018, the entire contents of all of which are expressly incorporated by reference into the present application.

TECHNICAL FIELD

The present invention relates to a negative electrode for a lithium secondary battery and a lithium secondary battery comprising the same.

BACKGROUND ART

Recently, there is increasing interest in energy storage technology. As the application area thereof extends to the energy for mobile phones, camcorders, notebook PCs, and even electric vehicles, the effort of research and development of electrochemical devices is being carried out more and more concretely.

Electrochemical devices are the most noteworthy area in this respect, and among them, the development of a secondary battery capable of charging/discharging is the focus of attention. Recently, in developing these batteries, research and development on the design of new electrodes and batteries have been conducted in order to improve capacity density and energy efficiency.

Among the secondary batteries currently being applied, the lithium secondary batteries developed in the early 1990s are attracting much attention as there is an advantage in that it has much higher operating voltage and energy density than conventional batteries such as Ni-MH, Ni—Cd, and sulfuric acid-lead batteries using an electrolyte solution in the form of an aqueous solution.

In particular, lithium-sulfur (Li—S) battery is a secondary battery using a sulfur-based material having an S—S bond (sulfur-sulfur bond) as a positive electrode active material and using lithium metal as a negative electrode active material. There is an advantage that sulfur, which is the main material of the positive electrode active material, is very rich in resources, is not toxic, and has a low atomic weight. In addition, theoretical discharge capacity of the lithium-sulfur battery is 1675 mAh/g-sulfur, and its theoretical energy density is 2,600 Wh/kg. Since the energy density of the lithium-sulfur battery is much higher than the theoretical energy density of other battery systems currently under study (Ni-MH battery: 450 Wh/kg, Li—FeS battery: 480 Wh/kg, Li—MnO$_2$ battery: 1,000 Wh/kg, Na—S battery: 800 Wh/kg), the lithium-sulfur battery is the most promising battery among the batteries developed so far.

During the discharging of the lithium-sulfur battery, an oxidation reaction of lithium occurs at the negative electrode (anode) and a reduction reaction of sulfur occurs at the positive electrode (cathode). Sulfur before discharging has an annular S$_8$ structure. During the reduction reaction (discharging), as the S—S bond is cut off, the oxidation number of S decreases, and during the oxidation reaction (charging), as the S—S bond is re-formed, electrical energy is stored and generated using an oxidation-reaction reaction in which the oxidation number of S increases. During this reaction, the sulfur is converted from the cyclic S$_8$ structure to the lithium polysulfide (Li$_2$S$_x$, x=8, 6, 4, 2) by the reduction reaction and eventually, when the lithium polysulfide is completely reduced, lithium sulfide (Li$_2$S) is finally produced. By the process of reducing to each lithium polysulfide, the discharging behavior of the lithium-sulfur battery is characterized by a step-wise discharge voltage unlike lithium ion battery.

Thus, lithium metal batteries such as Li—S, where lithium metal is applied as a negative electrode, are rapidly degrading due to the growth of lithium dendrite, its reactivity with electrolytes, and other side reactions.

In order to inhibit side reactions such as the electrolyte or the formation of lithium polysulfide, a lithium protective film is required. For this purpose, the protective film of polymer material is easily selected because of its process and stability but its strength is not sufficient and thus the performance of protective film is drastically reduced by lithium dendrite which grows during charging process.

Therefore, a protective film is required to protect the lithium from the cause of the side reaction of the electrolyte while suppressing the dendrite, and thus a material with high strength is required in order to suppress dendrite and a material with high electrolyte impregnation ability or high ion conductivity are required to drive the battery. However, since the polymer which carries electrolyte solution or has high ion conductivity has very low strength, it is important to solve both problems together.

(Patent Document 1) Korean Patent Laid-open Publication No. 2007-0021110, "Active Metal/Aqueous Electrochemical Cells and Systems."

DISCLOSURE

Technical Problem

The inventors of the present invention have conducted various studies and as a result, have found that by forming protective films of the double layer on the negative electrode, it is possible to control the growth of lithium dendrite as well as suppress the side reactions between the electrolyte and the lithium polysulfide, and the lithium metal negative electrode. That is, by applying a polymer protective film (the first protective film) with high ion conductivity or electrolyte uptake and low strength on the lithium surface, and applying the polymer protective film (the second protective film) with a relatively low electrolyte uptake or ion conductivity and a high strength between the separator and the first protective film, the inventors of the present invention have confirmed a method for controlling the growth of lithium dendrite as well as suppressing the side reaction between the electrolyte and the lithium polysulfide, and the lithium metal negative electrode.

Therefore, it is an object of the present invention to provide a negative electrode for a lithium secondary battery capable of controlling the growth of lithium dendrite as well as suppressing the side reaction between the electrolyte and the lithium polysulfide, and the lithium metal negative electrode.

Technical Solution

In order to achieve the above object, the present invention provides a negative electrode for a lithium secondary battery comprising a lithium metal layer; and a first protective layer formed on the lithium metal layer and a second protective layer formed on the first protective layer, wherein the first protective layer and the second protective layer are different from each other in at least one of ion conductivity and electrolyte uptake.

The present invention also provides a lithium secondary battery comprising the above-mentioned negative electrode.

Advantageous Effects

According to the present invention, there is an effect that the side reactions between the electrolyte and the lithium polysulfide, and the lithium metal negative electrode are inhibited while the growth of the lithium dendrite is also controlled.

DESCRIPTION OF DRAWINGS

FIG. 1 is a schematic diagram showing the structure of the lithium secondary battery according to an embodiment of the present invention.

FIG. 2 is a schematic diagram showing the growth process of lithium dendrite in the lithium secondary battery according to an embodiment of the present invention.

FIG. 3 is a graph showing discharging capacities and life characteristics of the lithium secondary batteries made of the negative electrodes in Examples of the present invention and Comparative Examples.

BEST MODE

Hereinafter, the present invention will be described in detail with reference to the accompanying drawings so that those skilled in the art can easily carry out the present invention. However, the present invention may be embodied in many different forms and is not limited to the description set forth herein.

In the drawings, in order to clearly illustrate the present invention, parts that are not related to the description of the present invention are omitted, and similar reference numerals are used for similar parts throughout the specification. Also, the size and relative size of the components shown in the figures are independent of the actual scale and may be reduced or exaggerated for clarity of description.

The terms and words used in the present specification and claims should not be construed as limited to ordinary or dictionary terms, and should be construed in a sense and concept consistent with the technical idea of the present invention, based on the principle that the inventor can properly define the concept of a term to describe his invention in the best way possible.

When a layer is referred to herein as being "on" another layer or substrate, it may be formed directly on another layer or substrate, or a third layer may be interposed therebetween. Also, in the present specification, directional expressions such as upper side, upper, top side, etc. can be understood as meaning lower side, lower, underside, etc. depending on the reference. That is, the expression of the spatial direction should be understood to be a relative direction, and should not be construed as limiting to mean an absolute direction.

In addition, it is to be understood that the term "comprise", "contain", "have" or the like is intended to designate the presence of features, numbers, components or combinations thereof stated in the specification, but not to preclude the possibility of the presence or addition of one or more other features, numbers, components or combinations thereof.

In the drawings, the thicknesses of the layers and regions may be exaggerated or omitted for the sake of clarity. The same reference numerals denote the same elements throughout the specification Also, in the following description of the present invention, a detailed description of known functions and configurations incorporated herein will be omitted when it may make the subject matter of the present invention rather unclear.

Negative Electrode for Lithium Secondary Battery

The negative electrode for the lithium secondary battery proposed in the present invention comprises a lithium metal layer; a first protective layer formed on a surface of the lithium metal layer; and a second protective layer formed on a surface of the first protective layer opposite the lithium metal layer, wherein the first protective layer and the second protective layer are different from each other in at least one property selected from the group consisting of ion conductivity and electrolyte uptake.

In general, when lithium metal is used as a negative electrode for a lithium secondary battery, the following problems exist. First, lithium metal batteries such as Li—S, where lithium metal is applied as a negative electrode, are rapidly degrading due to the growth of lithium dendrite, its reactivity with electrolytes, and other side reactions. Second, in order to solve the above problems, if the protective film of polymer material is used because of the process and stability, the strength of the protective film is drastically lowered by the lithium dendrite which grows in the charging process due to insufficient strength.

Therefore, in the case of the negative electrode for the lithium secondary battery of the present invention, the first protective layer and the second protective layer having different ion conductivity or electrolyte uptake are provided on the lithium metal layer, and thus the growth of the lithium dendrite and other side reactions can be prevented.

FIG. 1 is a schematic diagram showing the structure of the lithium secondary battery according to an embodiment of the present invention.

As shown in FIG. 1, the negative electrode for the lithium secondary battery of the present invention comprises a lithium metal layer; and a first protective layer formed on the lithium metal layer and a second protective layer formed on the first protective layer. The lithium metal layer may be a plate-shaped lithium metal and its width can be adjusted according to the shape of the electrode to facilitate the manufacture of the electrode.

In the negative electrode for the lithium secondary battery of the present invention, the first protective layer is formed on the lithium metal layer and the second protective layer is formed on the first protective layer.

In the negative electrode for the lithium secondary battery of the present invention, the first protective layer and the second protective layer may be prepared by a polymer solution dispersed in a solvent to be coated on the lithium metal layer through a wet process. The polymer or monomer may be mixed with a solvent coating solution and then formed by micro-gravure coating, comma coating, slot die coating, spray coating, dip coating, flow coating, or the like, but is not limited thereto.

The first protective layer and the second protective layer may be prepared by applying the composition to a glass substrate or the like, and curing and separating it, and then attaching to the lithium metal layer using an adhesive component such as polydopamine, an olefinic elastomer, a silicone-based elastomer, an acrylic elastomer, or the like, but is not limited thereto (the second protective layer is attached on the first protective layer), or applying the composition directly to the lithium metal layer and curing it (the second protective layer is applied on the first protective layer).

In the negative electrode for the lithium secondary battery of the present invention, the first protective layer and the second protective layer may be different from each other in at least one of ion conductivity and electrolyte uptake.

In the case of the battery using lithium metal as the active material in the negative electrode among lithium secondary batteries, if a bump occurs due to plating during the charging of the battery, the lithium ion is plated more rapidly on the protruding portion of lithium and at the same time, the dendrite grows. However, as shown in FIG. 2, when a double layer with different characteristics (the first protective layer and the second protective layer) is applied on a negative electrode, if the dendrite grows and at the same time, it penetrates into the second protective layer which has low ionic conductivity and high strength, the plating at the protruding portion is not easy. Rather, since the first protective layer on the surface of lithium has a high ionic conductivity and the plating occurs rapidly, the lithium plating is directed toward the surface and the growth of the dendrite is inhibited For these characteristics, in the negative electrode for the lithium secondary battery of the present invention, the electrolyte uptake of the first protective layer may be 150% or more and the electrolyte uptake of the second protective layer may be less than 150%. Since the negative electrode for the lithium secondary battery of the present invention comprises a plurality of protective layers having different electrolyte uptake values as described above, the occurrence of side reactions is prevented, the growth of the dendrite is inhibited and thus coulombic efficiency and discharging capacity can be increased.

Also, in the negative electrode for the lithium secondary battery of the present invention, the ion conductivity of the first protective layer may be $10^{-4}$ S/cm or more, preferably $2 \times 10^{-4}$ S/cm or more. Also, the ion conductivity of the second protective layer may be less than $10^{-4}$ S/cm, preferably $5 \times 10^{-5}$ S/cm less. Since the negative electrode for the lithium secondary battery of the present invention comprises a plurality of protective layers having different ion conductivity values as described above, the occurrence of side reactions is prevented, the growth of the dendrite is inhibited and thus coulombic efficiency and discharging capacity can be increased.

In addition, in the negative electrode for the lithium secondary battery of the present invention, the first protective layer and the second protective layer may have different modulus values from each other. Here, modulus is a measure of the elastic property of an arbitrary material and means the force that the material can withstand without being broken or deformed when applying physical and/or mechanical stress to the material, and the modulus is defined as a proportional coefficient between stress and strain for any spatial location and time in the material. That is, in the case of simple tensile, when stress is a, strain is e, and modulus is E, $\sigma = E \cdot \varepsilon$ is established. Also, in the present invention, the modulus may be a value obtained by measuring a change in frequency response depending on a stress applied using a dynamic mechanical analyzer (DMA) apparatus. Specifically, the modulus value of the first protective layer may be less than $10^7$ Pa, and the modulus value of the second protective layer may be $10^7$ Pa or more. Since the negative electrode for the lithium secondary battery of the present invention comprises a plurality of protective layers having different modulus values as described above, the occurrence of side reactions is prevented, the growth of the dendrite is inhibited and thus coulombic efficiency and discharging capacity can be increased.

In the negative electrode for the lithium secondary battery of the present invention, if the first protective layer and the second protective layer do not satisfy the conditions of the electrolyte uptake, ion conductivity or modulus as described above, the side reactions occur and the growth of the dendrite is not inhibited, and thus there are problems in coulombic efficiency and discharging capacity.

Specifically, the first protective layer comprises (a) one or more first polymer selected from the group consisting of a first polyethylene oxide (PEO) based polymer and a first polypropylene oxide (PPO) based polymer, and (b) a first lithium salt. The first polymer may be at least one selected from the group consisting of PEO, PPO and a blending of PEO and PPO, and a copolymer of PEO and PPO, such as PEO-PPO-PEO. The first lithium salt can be used without any particular limitation as long as it is a lithium salt used in the lithium secondary battery, and preferably, LiFSI or LiTFSI can be used. In the preparation of the first protective layer, the first protective layer may be prepared by dissolving the composition containing the first polymer and first lithium salt in a solvent and then casting it on a release film to form a film, drying the film, and transferring the film to the surface of lithium.

In addition, the second protective layer comprises (a) one or more second polymer selected from the group consisting of a second polyethylene oxide (PEO) based polymer and a second polypropylene oxide (PPO) based polymer, (b) a second lithium salt and (c) an oligomer comprising an acrylate functional group. The second polymer may be at least one selected from the group consisting of PEO, PPO and a blending of PEO and PPO, and a copolymer of PEO and PPO, such as PEO-PPO-PEO. The second lithium salt can be used without any particular limitation as long as it is a lithium salt used in the lithium secondary battery, and preferably, LiFSI or LiTFSI can be used. The oligomer may be used without any particular limitation as long as it is an oligomer having an acrylate functional group capable of crosslinking, and preferably an oligomer having 6 acrylate functional groups can be used. In the preparation of the second protective layer, the second protective layer can be prepared as a polymer film in the form of a semi-IPN (Interpenetrating Polymer Network) by adding the oligomer comprising the acrylate functional group to the composition comprising the second polymer and the lithium salt and crosslinking them.

In the negative electrode for the lithium secondary battery of the present invention, the first protective layer may have a thickness of 0.1 to 5 μm.

If the thickness of the first protective layer is smaller than the above range, it may be difficult for the protective layer to function as a protective layer. If the thickness is large, the interfacial resistance is increased and thus the battery characteristics may be deteriorated.

In the negative electrode for the lithium secondary battery of the present invention, the second protective layer may have a thickness of 0.1 to 5 μm.

If the thickness of the second protective layer is smaller than the above range, it may be difficult for the protective layer to function as a protective layer. If the thickness is large, the interfacial resistance is increased and thus the battery characteristics may be deteriorated.

Lithium Secondary Battery

In one embodiment of the present invention, the lithium secondary battery may comprise a positive electrode; the above-described negative electrode; and an electrolyte solution. In one embodiment of the present invention, the lithium secondary battery may comprise the above-described negative electrode for the lithium secondary battery; a positive electrode; a separator interposed between the positive electrode and the negative electrode; and an electrolyte which is impregnated in the negative electrode, the positive electrode, and the separator and comprises a lithium salt and an organic solvent.

Also, the lithium secondary battery may be a lithium-sulfur battery comprising a sulfur compound in the positive electrode.

The positive electrode can be formed in the form of a positive electrode by coating a composition comprising a positive electrode active material, a conductive material, and a binder on a positive electrode current collector.

The positive electrode active material comprises a sulfur compound, and the sulfur compound may comprise an elemental sulfur ($S_8$), a sulfur-based compound, or a mixture thereof. Specifically, the sulfur-based compound may be $Li_2S_n(n \geq 1)$, an organic sulfur compound, carbon-sulfur polymer $((C_2S_x)_n$: x=2.5 to 50, $n \geq 2$) or the like. They are applied in combination with electrically conductive material because sulfur alone is not electrically conductive.

Specifically, a conductive material may be added to the positive electrode composition to impart additional conductivity to the prepared sulfur-carbon composite. The conductive material plays a role in allowing electrons to move smoothly within the positive electrode, and is not particularly limited as long as it is excellent in conductivity and can provide a large surface area without causing chemical change in the battery, but preferably a carbon-based material is used.

The carbon-based material may be any one selected from the group consisting of graphite-based materials such as natural graphite, artificial graphite, expanded graphite and graphene, activated carbon-based material, carbon black-based materials such as channel black, furnace black, thermal black, contact black, lamp black and acetylene black; carbon fiber-based materials, carbon nanotubes (CNT), carbon nanostructures such as fullerene, and mixtures thereof.

In addition to the carbon-based materials, metallic fibers such as metal mesh; metallic powder such as copper (Cu), silver (Ag), nickel (Ni) and aluminum (Al); or organic conductive materials such as polyphenylene derivatives can also be used depending on the purpose. The conductive materials may be used alone or in combination.

Also, in order to provide the positive electrode active material with an adhesion to the current collector, the positive electrode composition may further comprise a binder. The binder should be well dissolved in the solvent, and should not only constitute the conductive network well between the positive electrode active material and the conductive material, but also have a proper impregnation property into the electrolyte solution.

The binder applicable to the present invention may be any binder known in the art, and specifically may be, but is not limited to, at least one selected from the group consisting of fluororesin-based binders comprising polyvinylidene fluoride (PVdF) or polytetrafluoroethylene (PTFE); rubber-based binders comprising styrene-butadiene rubber, acrylonitrile-butadiene rubber, and styrene-isoprene rubber; cellulose-based binders comprising carboxymethylcellulose (CMC), starch, hydroxypropylcellulose, and regenerated cellulose; polyalcohol-based binders; polyolefin-based binders comprising polyethylene and polypropylene; polyimide-based binders, polyester-based binders, and silane-based binders, or mixtures or copolymers of two or more thereof.

The content of the binder resin may be, but is not limited to, 0.5 to 30% by weight based on the total weight of the positive electrode for the lithium secondary battery. If the content of the binder resin is less than 0.5% by weight, the physical properties of the positive electrode may be deteriorated and thus positive electrode active material and the conductive material can be broken away. If the content exceeds 30% by weight, the ratio of the active material and the conductive material in the positive electrode is relatively reduced, and the battery capacity can be reduced.

A solvent for preparing a positive electrode composition for a lithium secondary battery in a slurry state should be easy to dry and should dissolve the binder well, and most preferably, the solvent is a solvent which capable of keeping the positive electrode active material and the conductive material in a dispersed state without dissolving them. If the solvent dissolves the positive electrode active material, since the specific gravity (D=2.07) of sulfur in the slurry is high, sulfur is submerged in the slurry and thus sulfur is concentrated in the current collector during the coating process and there is a tendency that problems occur in the conductive network, thereby occurring problems in the operation of the battery.

The solvent according to the present invention may be water or an organic solvent. The organic solvent may be an organic solvent comprising at least one selected from the group consisting of dimethylformamide, isopropyl alcohol, acetonitrile, methanol, ethanol, and tetrahydrofuran.

The positive electrode composition may be mixed by stirring by a conventional method using conventional mixers such as a latex mixer, a high-speed shear mixer, a homo-mixer, or the like.

The positive electrode composition may be applied to the current collector and dried in a vacuum to form a positive electrode for the lithium secondary battery. The slurry can be coated on the current collector with an appropriate thickness depending on the viscosity of the slurry and the thickness of the positive electrode to be formed, and can be appropriately selected within a range of preferably 10 to 300 μm.

In this case, there is no limitation on the method of coating the slurry, and the method of coating the slurry may comprise, for example, a doctor blade coating, a dip coating, a gravure coating, a slit die coating, a spin coating, a comma coating, a bar coating, a reverse roll coating, a screen coating, a cap coating method and the like.

The positive electrode current collector generally has a thickness of 3 to 500 μm and is not particularly limited as long as it has high conductivity without causing chemical change in the battery. For example, a conductive metal such as stainless steel, aluminum, copper, or titanium, etc., can be used as the positive electrode current collector, and preferably an aluminum current collector can be used. The positive electrode current collector may be formed in various forms such as film, sheet, foil, net, porous body, foam or nonwoven fabric.

The separator interposed between the positive electrode and the negative electrode separates or isolates the positive and negative electrodes from each other, allows the transport of lithium ions between the positive and negative electrodes, and can be made of porous nonconductive or insulating materials. The separator may be an independent member such as a film or a thin film as an insulator having high ion permeability and mechanical strength, and may be a coating layer added to the positive electrode and/or the negative electrode. Also, when a solid electrolyte such as a polymer is used as an electrolyte, the solid electrolyte may also serve as a separator.

The separator preferably has a pore diameter of 0.01 to 10 μm and a thickness of 5 to 300 μm. Glass electrolyte, polymer electrolyte or ceramic electrolyte, etc., can be used as the separator. For example, olefin-based polymers such as polypropylene having chemical resistance and hydrophobicity, a sheet or nonwoven fabric made of glass fiber or polyethylene, Kraft paper and the like are used. Representative examples currently available on the market comprise Celgard series (Celgard® 2400, 2300 product from Hoechest Celanese Corp.), polypropylene separator (product from Ube Industries Ltd. or product from Pall RAI), polyethylene series (Tonen or Entek), and the like.

The electrolyte separator in the form of solid may comprise less than about 20% by weight of non-aqueous organic solvent. In this case, an appropriate gelling agent may be further comprised to reduce the fluidity of the organic solvent. Representative examples of such gelling agent may comprise polyethylene oxide, polyvinylidene fluoride, and polyacrylonitrile, etc.

The electrolyte impregnated in the negative electrode, the positive electrode, and the separator is composed of a lithium salt and an electrolyte solution as a non-aqueous electrolyte containing the lithium salt. Non-aqueous organic solvent, organic solid electrolyte, and inorganic solid electrolyte, etc., are used as the electrolyte solution.

The lithium salt of the present invention is a substance which can be easily dissolved in a non-aqueous organic solvent, and for example, may comprise at least one selected from the group consisting of LiSCN, LiCl, LiBr, LiI, LiPF$_6$, LiBF$_4$, LiSbF$_6$, LiAsF$_6$, LiB$_{10}$Cl$_{10}$, LiCH$_3$SO$_3$, LiCF$_3$SO$_3$, LiCF$_3$CO$_2$, LiClO$_4$, LiAlCl$_4$, Li(Ph)$_4$, LiC(CF$_3$SO$_2$)$_3$, LiN(FSO$_2$)$_2$, LiN(CF$_3$SO$_2$)$_2$, LiN(C$_2$F$_5$SO$_2$)$_2$, LiN(SFO$_2$)$_2$, LiN(CF$_3$CF$_2$SO$_2$)$_2$, lithium chloroborane, lithium lower aliphatic carboxylate, lithium tetraphenyl borate, lithium imide, and mixtures thereof.

The concentration of the lithium salt may be 0.2 to 2 M, preferably 0.6 to 2 M, more preferably, 0.7 to 1.7 M, depending on various factors such as the exact composition of the electrolyte mixture, the solubility of the salt, the conductivity of the dissolved salt, the charge and discharge conditions of the battery, the operating temperature and other factors known in the lithium battery field. If the concentration of the lithium salt is less than 0.2 M, the conductivity of the electrolyte may be lowered and thus the performance of the electrolyte may be deteriorated. If the concentration of the lithium salt exceeds 2 M, the viscosity of the electrolyte may increase and thus the mobility of the lithium ion (Li$^+$) may be reduced.

The non-aqueous organic solvent should dissolve the lithium salt well, and the non-aqueous organic solvent of the present invention may comprise, for example, aprotic organic solvents such as N-methyl-2-pyrrolidone, propylene carbonate, ethylene carbonate, butylene carbonate, dimethyl carbonate, diethyl carbonate, ethyl methyl carbonate, gamma-butyrolactone, 1,2-dimethoxyethane, 1,2-diethoxyethane, tetrahydroxy franc, 2-methyl tetrahydrofuran, dimethylsulfoxide, 1,3-dioxolane, 4-methyl-1,3-dioxen, diethylether, formamide, dimethylformamide, dioxolane, acetonitrile, nitromethane, methyl formate, methyl acetate, phosphate triester, trimethoxymethane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate, and these organic solvents can be used alone or in a mixed solvent form of two or more solvents thereof.

As the organic solid electrolyte, for example, polyethylene derivatives, polyethylene oxide derivatives, polypropylene oxide derivatives, phosphate ester polymers, poly agitation lysine, polyester sulfide, polyvinyl alcohol, polyvinylidene fluoride, and polymers comprising ionic dissociation groups and the like can be used.

As the inorganic solid electrolyte, for example, nitrides, halides, sulfates and the like of Li such as Li$_3$N, LiI, Li$_5$NI$_2$, Li$_3$N—LiI—LiOH, LiSiO$_4$, LiSiO$_4$—LiI—LiOH, Li$_2$SiS$_3$, Li$_4$SiO$_4$, Li$_4$SiO$_4$—LiI—LiOH, Li$_3$PO4-Li$_2$S—SiS$_2$ may be used.

To the electrolyte of the present invention, for example, pyridine, triethylphosphite, triethanolamine, cyclic ether, ethylene diamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salt, pyrrole, 2-methoxy ethanol, or aluminum trichloride, etc. may also be added for the purpose of improving charge-discharge characteristics, flame retardancy, and the like. In some cases, a halogen-containing solvent such as carbon tetrachloride, ethylene trifluoride or the like can be also added for the purpose of imparting nonflammability, and a carbon dioxide gas can be further comprised for the purpose of improving storage characteristics at a high temperature, and FEC (fluoro-ethylene carbonate), PRS (propene sultone), FPC (fluoro-propylene carbonate) and the like can be further comprised.

The electrolyte may be used as a liquid electrolyte or also as an electrolyte separator form in a solid state. When used as a liquid electrolyte, a separator made of porous glass, plastic, ceramic, or polymer is further comprised as a physical separator having a function of physically separating the electrodes.

Hereinafter, preferred examples are provided to help understand the present invention. However, it will be apparent to those skilled in the art that the following examples are illustrative of the present invention and that various changes and modifications can be made within the scope and spirit of the present invention, and such variations and modifications are within the scope of the appended claims.

EXAMPLES

Manufacture of Lithium Secondary Battery

Example 1

To a mixture of PEO and PEO-PPO-PEO in a weight ratio of 1:1, LiFSI in a molar ratio satisfying O/Li=20 based on the total amount of oxygen atoms contained in PEO and PEO-PPO-PEO was added to form a composition, and the composition was dissolved in an acetonitrile solvent and then cast on a release film to form a film. After casting, it was dried at 60° C. under vacuum for 8 hours to sufficiently remove the solvent. Then, the film was transferred to the surface of lithium at a temperature of 60° C. to form a first protective film of 2 μm on a lithium metal electrode of 40 μm.

Thereafter, by a method of mixing PEO and LiFSI in a molar ratio satisfying O/Li=20, and then adding an oligomer having 6 acrylate functional groups (Dipentaerythritol Hexaacrylate from Sigma-Aldrich) and thus crosslinking them, a semi-IPN (Interpenetrating Polymer Network) polymer film having a thickness of 2 μM was formed as a second protective film on the first protective film.

Next, PEO (Mv~4,000,000) and LiFSI were dissolved in acetonitrile (AN) in an amount satisfying EO/Li=20/1, Dipentaerythritol Hexaacrylate and initiator BPO (benzoyl peroxide) in an amount of 30 wt. % based on the PEO20-LiFSI were added to the mixed solution and stirred until a homogeneous solution was obtained. At this time, BPO was mixed in an amount of 1 wt. % based on Dipentaerythritol Hexaacrylate. Thereafter, the mixture was cast on a release film substrate, and then dried under vacuum at room temperature to completely remove the AN, and then cured at 80° C. for 12 hours to leave no unreacted acrylate. Thereafter, the formed film was transferred to form a separator on the second protective film.

Thereafter, the conventional sulfur-carbon composite, the conductive material (carbon black) and the binder (styrene butadiene rubber and carboxymethyl cellulose mixed at 5:5) were mixed in a weight ratio of 90:5:5 of conventional sulfur-carbon composite:conductive material:binder to prepare a slurry, and then the slurry was coated on the current collector of an aluminum foil having a thickness of 20 μm to prepare a 5 mAh/cm$^2$ loaded sulfur electrode, and thereafter, the sulfur electrode was placed on the separator and 50 μl of ether electrolyte solution was injected to manufacture a coin cell.

For the first protective film and the second protective film thus prepared, after preparing the polymer films. the ratio obtained by subtracting the weight before immersion from the weight after immersing in ether-based electrolyte for 48 hours, and then dividing by the weight before immersion was defined as the electrolyte uptake. The amount of electrolyte impregnated in the first protective film thus measured was 500%, and the amount of electrolyte impregnated in the second protective film was 100%.

In addition, the ion conductivities of the first protective film and the second protective film thus prepared were measured by EIS measurement using Potentiostat (VMP3 Multichannel potentiostat from Bio-logic Science Instruments), and the ionic conductivity of the first protective film was $5 \times 10^{-4}$ S/cm, and the ionic conductivity of the second protective film was $3 \times 10^{-5}$ S/cm.

In addition, the modules of the first protective film and the second protective film were measured using a Dynamic Mechanical Analyzer (TA Instrument) from 0.1 Hz to 100 Hz at a heating rate of 10° C./min in a temperature range of 25° C. to 60° C., and the modulus of the first protective film was $10^4$ Pa, and the modulus of the second protective film was $2 \times 10^7$ Pa.

Example 2

The composition obtained by adding LiTFSI to PEO in a molar ratio satisfying O/Li=20 based on the total amount of oxygen atoms contained in PEO was dissolved in acetonitrile solvent and cast on a release film to form a film. After casting, it was dried at 60° C. under vacuum for 8 hours to sufficiently remove the solvent. Then, the film was transferred to the surface of lithium at a temperature of 60° C. to form a first protective film of 2 μm on a lithium metal electrode of 40 μm. The ionic conductivity of the first protective film was $2 \times 10^{-4}$ S/cm and the electrolyte impregnation amount was 300%. After that, the formation of the second protective film and the battery configuration were the same as Example 1.

Comparative Example 1

A coin cell was manufactured in the same manner as in Example 1 except that the first protective film and the second protective film were not formed.

Comparative Example 2

A coin cell was manufactured in the same manner as in Example 1, except that the first protective film was not formed but only the second protective film was formed in a thickness of 3 μm to form a single protective film.

Experimental Example 1: Evaluation of Battery Performance

Thereafter, the discharging capacities and life characteristics of the coin cells of Examples 1 and 2 and Comparative Examples 1 and 2 were measured using the charging and discharging measurement apparatus. Specifically, the first cycle was charged/discharged at 0.1 C, and then the charging/discharging efficiencies were measured by repeating the cycle of charging/discharging at 0.2 C for 100 cycles (CC: Constant Current, CV: Constant Voltage). The results obtained at this time are shown in FIG. 3.

Referring to FIG. 3, it can be seen that the lithium secondary batteries of Examples 1 and 2 showed stable coulombic efficiency over 100 cycles or more and the decrease of capacities was also slowly progressed.

On the other hand, it can be seen that the lithium secondary battery manufactured in Comparative Example 1 showed remarkable reductions in coulombic efficiency and discharging capacity in only 45 cycles and was degenerated.

Also, considering Comparative Example 2, it can be seen that when a single protective film is applied, the overvoltage is larger and the effect of life improvement is not great. On the other hand, it can be seen that Example 1 and Example 2 in which a double layer of protective films was applied were maintained for 100 cycles or more due to the effect of the protective films of the double layer according to the present invention.

Through these, it can be seen that in the case of the protective films of the double layer applied to the lithium electrode, stable coulombic efficiency was shown, and the decrease in capacity was slowly progressed.

The invention claimed is:

1. A negative electrode for a lithium secondary battery comprising:
   a lithium metal layer;
   a first protective layer formed on a surface of the lithium metal layer; and
   a second protective layer formed on a surface of the first protective layer opposite the lithium metal layer,
   wherein the first protective layer and the second protective layer are different from each other in ion conductivity, elastic modulus, and electrolyte uptake,
   wherein the electrolyte uptake of the first protective layer is 150% or more and the electrolyte uptake of the second protective layer is less than 150%,
   wherein the ion conductivity of the first protective layer is $10^{-4}$ S/cm or more and the ion conductivity of the second protective layer is less than $10^{-4}$ S/cm, and
   wherein the elastic modulus value of the first protective layer is less than $10^7$ Pa, and the elastic modulus value of the second protective layer is $10^7$ Pa or more.

2. The negative electrode for the lithium secondary battery according to claim 1, wherein the first protective layer comprises (a) one or more first polymer selected from the group consisting of a first polyethylene oxide (PEO) based polymer and a first polypropylene oxide (PPO) based polymer, and (b) a first lithium salt.

3. The negative electrode for the lithium secondary battery according to claim 2, wherein the first polymer is at least one selected from the group consisting of PEO, PPO, copolymers of PEO and PPO, and a blending of PEO and PPO.

4. The negative electrode for the lithium secondary battery according to claim 1, wherein the second protective layer comprises (a) one or more second polymer selected from the group consisting of a second polyethylene oxide (PEO) based polymer and a second polypropylene oxide (PPO) based polymer, (b) a second lithium salt and (c) an oligomer comprising an acrylate functional group.

5. The negative electrode for the lithium secondary battery according to claim 4, wherein the second polymer is at least one selected from the group consisting of PEO, PPO, copolymers of PEO and PPO, and a blending of PEO and PPO.

6. The negative electrode for the lithium secondary battery according to claim 4, wherein the oligomer comprising the acrylate functional group is an oligomer having 6 acrylate functional groups.

7. The negative electrode for the lithium secondary battery according to claim 1, wherein the first protective layer has a thickness of 0.1 to 5 μm.

8. The negative electrode for the lithium secondary battery according to claim 1, wherein the second protective layer has a thickness of 0.1 to 5 μm.

9. A lithium secondary battery comprising a positive electrode; the negative electrode of claim 1; and an electrolyte solution.

10. The lithium secondary battery according to claim 9, wherein the positive electrode comprises a sulfur compound in an active material.

\* \* \* \* \*